(12) United States Patent
Sisco et al.

(10) Patent No.: US 9,517,511 B1
(45) Date of Patent: Dec. 13, 2016

(54) INTERNAL CHAMFERING DEVICE AND METHOD

(71) Applicant: The Boeing Company, Chicago, IL (US)

(72) Inventors: Farahnaz Sisco, Mukilteo, WA (US); Everette D. Gray, Seattle, WA (US); Mekonnen Tsegga, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 739 days.

(21) Appl. No.: 13/784,442

(22) Filed: Mar. 4, 2013

Related U.S. Application Data

(63) Continuation-in-part of application No. 12/118,068, filed on May 9, 2008, now Pat. No. 8,388,277.

(51) Int. Cl.
| | |
|---|---|
| *B23B 35/00* | (2006.01) |
| *B23Q 17/22* | (2006.01) |
| *B23B 51/10* | (2006.01) |
| *B23B 29/034* | (2006.01) |

(52) U.S. Cl.
CPC ........... *B23B 35/00* (2013.01); *B23Q 17/2233* (2013.01); *B23B 29/034* (2013.01); *B23B 51/101* (2013.01); *B23B 51/102* (2013.01); *B23B 2260/128* (2013.01); *B23C 2226/27* (2013.01)

(58) Field of Classification Search
CPC .... B23B 51/101; B23B 51/102; B23B 29/034; B23B 35/00; B23B 2260/128; B23C 2226/27
See application file for complete search history.

(56) References Cited

U.S. PATENT DOCUMENTS

| | | | |
|---|---|---|---|
| 2,713,360 | A | 7/1955 | Bloch et al. |
| 4,778,313 | A | 10/1988 | Lehmkuhl |
| 4,949,039 | A | 8/1990 | Grunberg |
| 5,116,168 | A | 5/1992 | Aihara |
| 5,120,167 | A | 6/1992 | Simpson |
| 5,197,361 | A | 3/1993 | Carrier et al. |
| 5,613,810 | A | 3/1997 | Bureller |
| 5,685,674 | A | 11/1997 | Taquist et al. |

(Continued)

FOREIGN PATENT DOCUMENTS

| | | |
|---|---|---|
| DE | 4010075 A1 | 10/1991 |
| DE | 4228322 A1 | 3/1994 |

OTHER PUBLICATIONS

United States Patent and Trademark Office, "Notice of Allowance," issued in connection with U.S. Appl. No. 12/118,068, mailed on Nov. 6, 2012, 13 pages.

(Continued)

*Primary Examiner* — Eric A Gates
*Assistant Examiner* — Paul M Janeski
(74) *Attorney, Agent, or Firm* — Hanley, Flight & Zimmerman, LLC

(57) ABSTRACT

A method of forming an opening in a layered structure includes providing a layered structure including a first layer and a second layer and a near-zero gap interface defined between the first layer and the second layer; providing an opening through the layered structure such that the opening extends through the first layer and the second layer; and working simultaneously the opening in the fay surface of the first layer and the opening in the fay surface of the second layer without separating the first layer and the second layer. An internal chamfering device is also disclosed.

22 Claims, 10 Drawing Sheets

(56) References Cited

U.S. PATENT DOCUMENTS

| | | |
|---|---|---|
| 5,857,813 A | 1/1999 | Kress et al. |
| 6,158,929 A | 12/2000 | Fisher |
| 6,331,093 B1 | 12/2001 | Graham et al. |
| 7,328,637 B2 | 2/2008 | Takashima et al. |
| 8,388,277 B2 | 3/2013 | Gray et al. |
| 2009/0279970 A1 | 11/2009 | Gray et al. |

OTHER PUBLICATIONS

United States Patent and Trademark Office, "Final Office Action," issued in connection with U.S. Appl. No. 12/118,068, mailed on Jun. 20, 2012, 15 pages.

United States Patent and Trademark Office, "Non-Final Office Action," issued in connection with U.S. Appl. No. 12/118,068, mailed on Oct. 11, 2011, 37 pages.

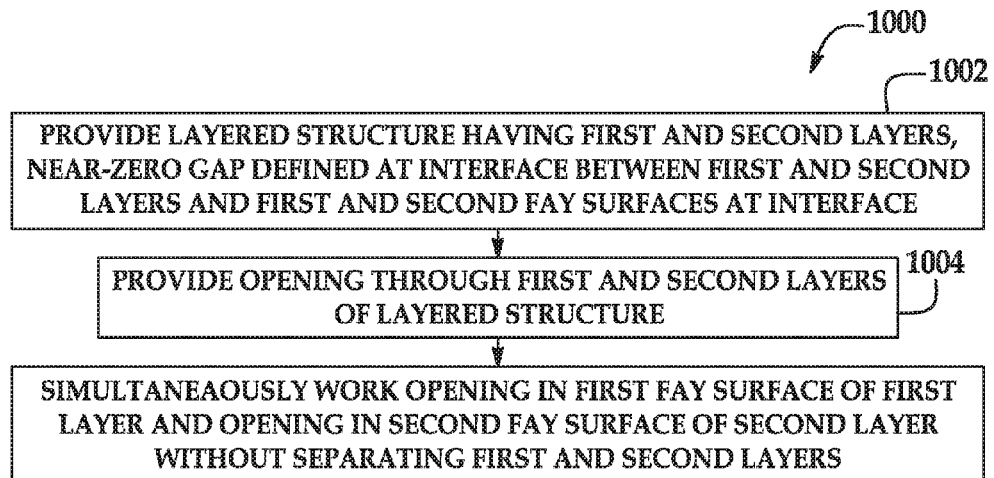
FIG. 10
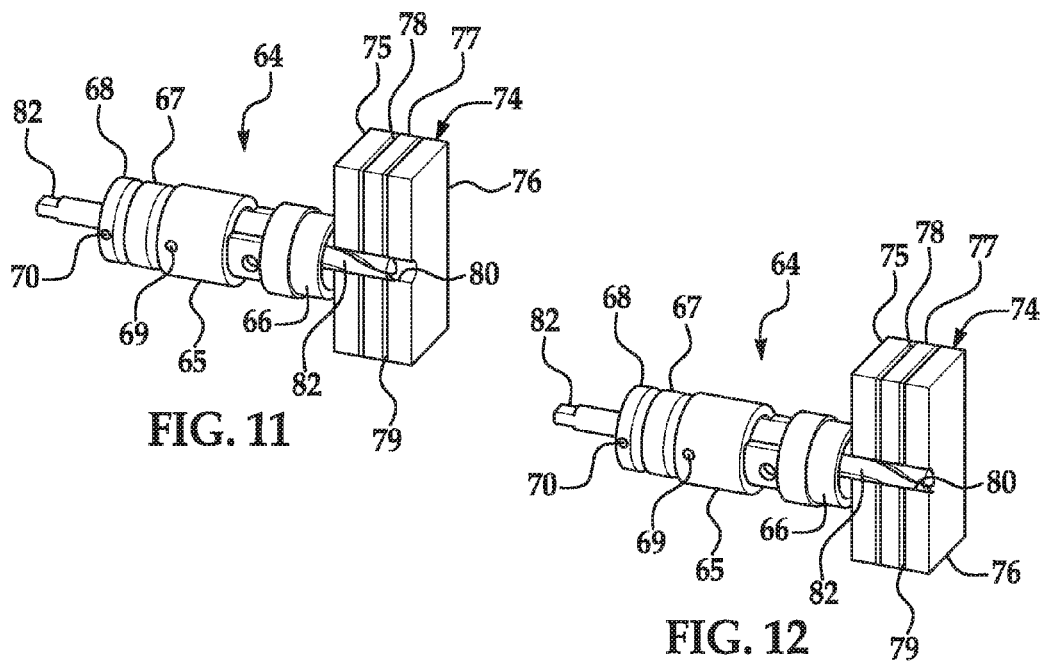
FIG. 11
FIG. 12
FIG. 13

INTERNAL CHAMFERING DEVICE AND METHOD

RELATED APPLICATION

This patent arises from a continuation-in-part of U.S. application Ser. No. 12/118,068, filed May 9, 2008, which is hereby incorporated herein by reference in its entirety.

TECHNICAL FIELD

The disclosure relates to chamfering devices. More particularly, the disclosure relates to an internal chamfering device and method suitable for deburring and chamfering drilled fastener openings in mating parts.

BACKGROUND

Component parts which include titanium and carbon fiber-reinforced plastic may be assembled with standard aircraft fasteners. The fastener openings drilled in these parts may be subject to entry/exit burrs that may reduce the fatigue strength of the titanium part. A key problem in the conventional drilling process is the difficulty and expense of disassembling, deburring and applying a chamfer to drilled parts in a time-effective and cost-effective manner.

SUMMARY

The disclosure is generally directed to a method of forming an opening in a layered structure. An illustrative embodiment of the method includes providing a layered structure including a first layer and a second layer and a near-zero gap interface defined between the first layer and the second layer; providing an opening through the layered structure such that the opening extends through the first layer and the second layer; and working simultaneously the opening in the fay surface of the first layer and the opening in the fay surface of the second layer without separating the first layer and the second layer.

The disclosure is further generally directed to an internal chamfering device. An illustrative embodiment of the device includes a generally elongated device housing having a tool bit opening; a cam bar provided in the device housing and displaceable along a longitudinal axis of the device housing; a slot depression provided in the cam bar; a tool bit slot provided in the cam bar and extending along the slot depression; and a tool bit slidably engaging the tool bit slot and extendable through the tool bit opening.

BRIEF DESCRIPTION OF THE ILLUSTRATIONS

FIG. 10 is a flow diagram that illustrates an illustrative embodiment of a method of forming an opening in a layered structure.

FIG. 11 is a perspective view of a deburring tool, more particularly illustrating adjustment of a cutting blade in an opening previously drilled in a titanium/graphite/titanium stack workpiece preparatory to deburring of the opening.

FIG. 12 is a perspective view of a deburring tool shown in FIG. 11, more particularly illustrating a second position of the cutting blade in the opening.

FIG. 13 is a schematic diagram that illustrates positioning of the cutting blade of the deburring tool for deburring of the opening.

DETAILED DESCRIPTION

The examples disclosed herein relate to locating and deburring an interface between layered structures of, for example, an aircraft structure, an aircraft wing, fuselage components, etc. In some examples, if an aperture that receives a fastener to couple the layered structure is out of tolerance, the out of tolerance aperture is re-bored without separating the layers and/or without removing other fasteners that couple the layers together. Re-boring the aperture increases the size of the aperture and may create a burr at an interface between the layers. If the burr is not removed the fatigue life of the layers may decrease. Using the examples disclosed herein, a location of the interface between the layers may be determined using a sensor such as an ultrasonic sensor and this location information may be used by and/or entered into a chamfering and/or deburring tool that removes the burr at the interface. In some examples, the burr is blindly removed and/or removed without taking the layers apart.

The disclosure is generally directed to an internal chamfering device and method suitable for creating a material interface chamfer for the reduction of fatigue created by entry and exit burrs in the process of drilling fastener openings in interfacing first and second layers of a layered structure. The internal chamfering device is particularly suitable for creating a material interface chamfer in fastener openings drilled in interfacing component parts in the fabrication of aircraft. However, the internal chamfering device is adaptable to creating a material interface chamfer for the reduction of fatigue in fastener openings drilled in interfacing component parts in a variety of industries.

Figure 1:
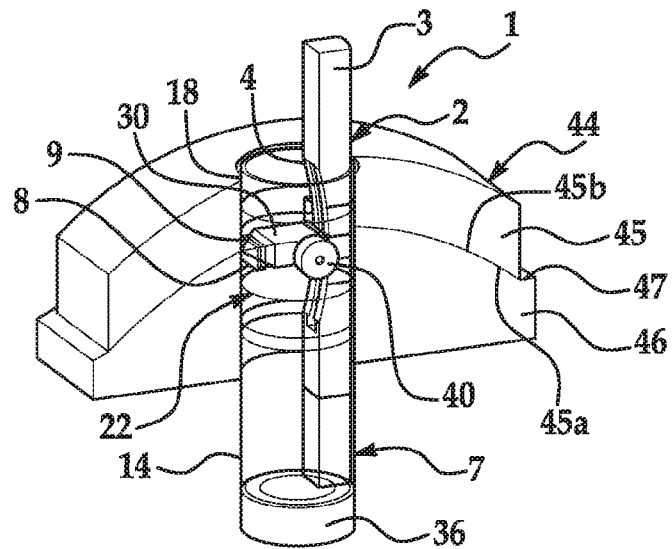
FIG. 1 is a perspective view of an illustrative embodiment of the internal chamfering device, deburring an opening extending through first and second layers of a layered structure.
Figure 2:
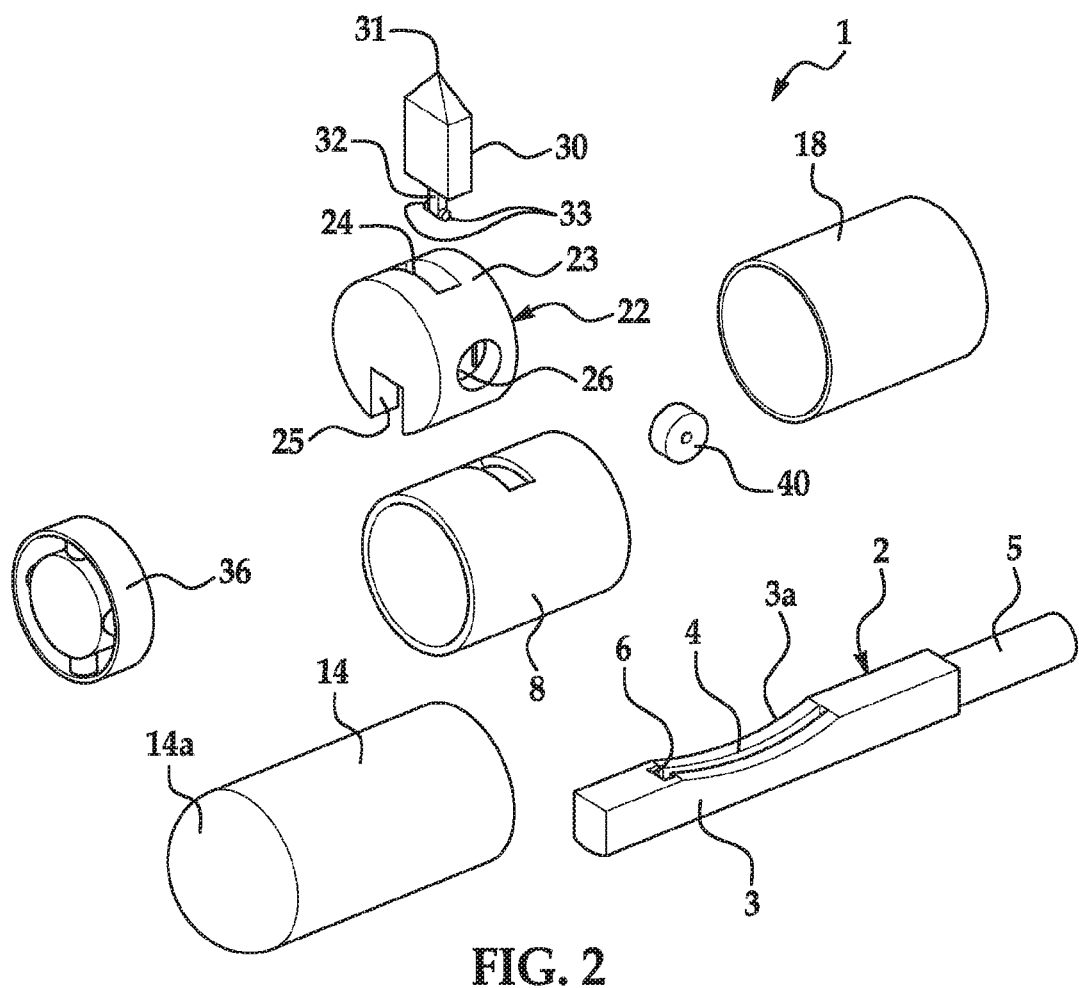
FIG. 2 is an exploded perspective view of an illustrative embodiment of the internal chamfering device.
Figure 3:
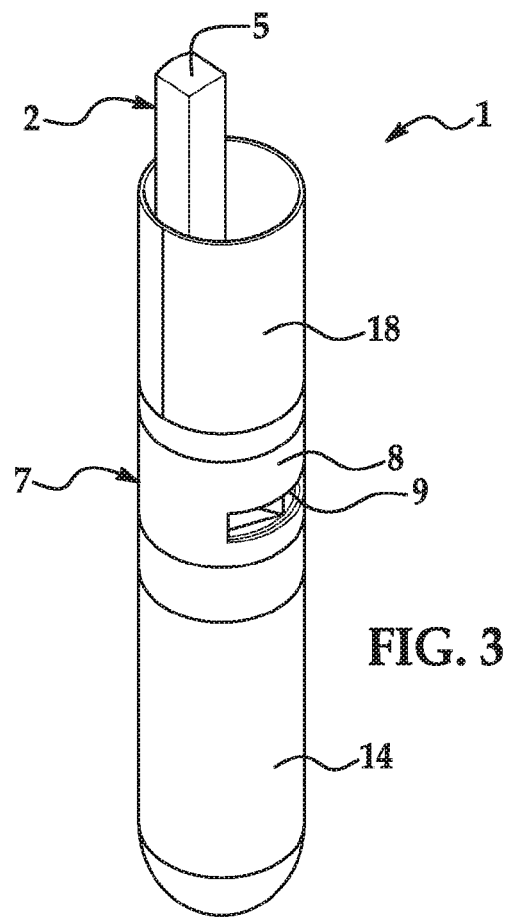
FIG. 3 is a side perspective view of an illustrative embodiment of the internal chamfering device.

Referring initially to FIGS. 1-6 and 8 of the drawings, an illustrative embodiment of the internal chamfering device, hereinafter device, is generally indicated by reference numeral 1. The device 1 may include a device housing 7 (FIGS. 3 and 4) which may have a generally elongated, cylindrical shape. As shown in FIG. 2, the device housing 7 may include a generally elongated, cylindrical tool base 14, which may have a convex base cap 14a; and a generally elongated, cylindrical rear sleeve 18 which is disposed in spaced-apart relationship with respect to the tool base 14. A center sleeve 8 may be displaceably mounted between the tool base 14 and the rear sleeve 18 along a longitudinal axis of the device housing 7, according to the knowledge of those skilled in the art. A tool bit opening 9 may extend through the wall of the center sleeve 8 for purposes which will be hereinafter described.

Figure 4:
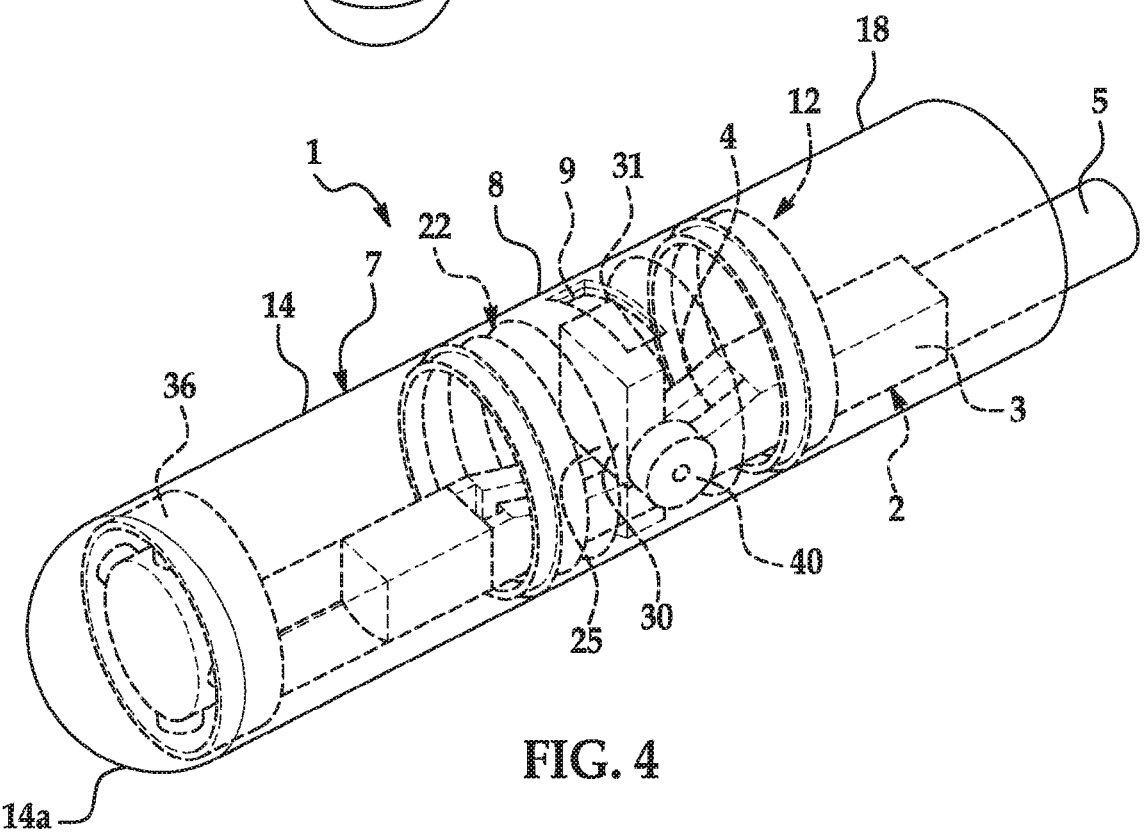
FIG. 4 is a front perspective view of an illustrative embodiment of the internal chamfering device.
Figure 5:
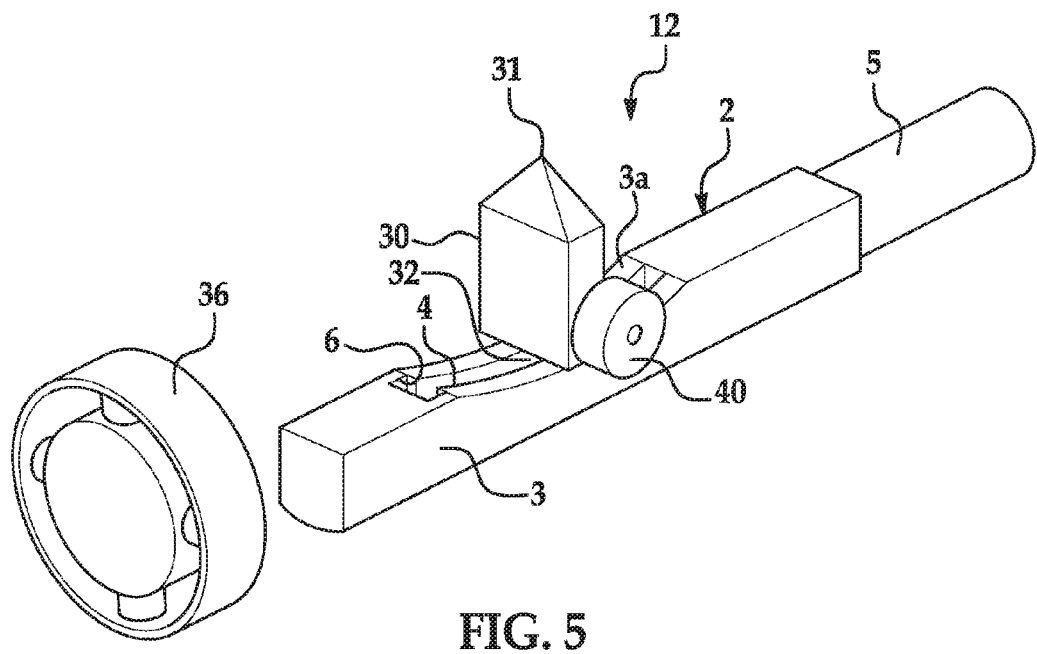
FIG. 5 is a perspective view of a cutting assembly of an illustrative embodiment of the internal chamfering device.
Figure 6:
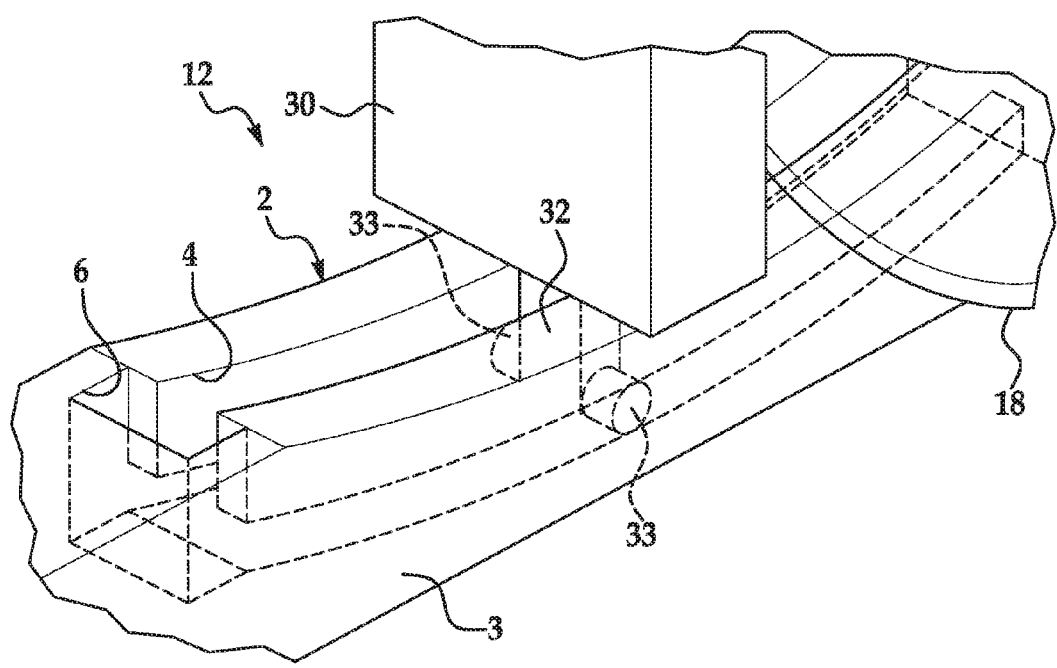
FIG. 6 is a perspective view illustrating an exemplary technique for attaching a tool bit to a cam bar of an illustrative embodiment of the internal chamfering device.

As shown in FIG. 5, a cutting assembly 12 may be provided in the device housing 7 (FIG. 4) of the device 1. The cutting assembly 12 may include a generally elongated cam bar 2 which may extend through the interior of the device housing 7 which is defined by the tool base 14, the center sleeve 8 and the rear sleeve 18. The cam bar 2 may be mounted for linear displacement in the device housing 7 along a longitudinal axis of the device 1 as will be hereinafter described. The cam bar 2 may have a generally elongated slotted bar portion 3 which may have a generally rectangular cross-section. A bar extension 5 may extend from the slotted bar portion 3. A generally concave slot depression 3a may extend into a surface of the slotted bar portion 3. An elongated tool bit slot 4 may extend into the slotted bar portion 3 along the slot depression 3a. An attachment pin slot 6 may be provided in the slotted bar portion 3 at one end of the tool bit slot 4.

The cutting assembly 12 may include a tool bit 30 which has a cutting point 31 and is stationary with respect to the tool bit opening 9 in the center sleeve 8. The tool bit 30 may be mounted in the tool bit slot 4 using any suitable technique known to those skilled in the art. As shown in FIG. 2, in some embodiments, a tool bit flange 32 may extend from the tool bit 30. Attachment pins 33 (FIG. 6) may extend from opposite sides of the tool bit flange 32. The attachment pins 33 may be inserted into the tool bit slot 4 through the attachment pin slot 6 to slidably mount the tool bit 30 along the tool bit slot 4. Therefore, as the cam bar 2 is moved linearly along the interior of the device housing 7, the tool bit slot 4 moves with respect to the stationary tool bit 30. When it is located at the center portion of the slot depression 3a, the tool bit 30 reverts to a retracted position with respect to the tool bit opening 9 of the device housing 7, as shown in FIGS. 1 and 4. Conversely, when it is located at either end portion of the slot depression 3a, the tool bit 30 is extended from the device housing 7 through the tool bit opening 9 for purposes which will be hereinafter described. A giant magnetoresistive tracking probe 40 may be located 90 degrees either counter clockwise or clockwise from the central axis of the tool bit 30 for purposes of tracking the position of the tool bit 30.

As further shown in FIG. 2, in some embodiments, the cutting assembly 12 may include a tool bit guide 22 which may be mounted inside the center sleeve 8 of the device housing 7. The tool bit guide 22 may have a generally cylindrical guide body 23. A tool bit slot 24 may extend into the guide body 23 in generally aligned or registering relationship with respect to the tool bit opening 9 provided in the center sleeve 8. A guide notch 25 may be provided in the guide body 23. The guide notch 25 may be sized and configured to receive the slotted bar portion 3 of the cam bar 2 and facilitate selective bidirectional linear displacement of the cam bar 2 with respect to the tool bit guide 22. A tracking probe opening 26 may be provided in the guide body 23 to accommodate the giant magnetoresistive tracking probe 40. The tool bit 30 extends through the tool bit slot 24 such that the tool bit guide 22 maintains the tool bit 30 in a stationary position with respect to the tool bit opening 9 inside the device housing 7.

As shown in FIGS. 4 and 5, the device 1 may include two GMR sensors: a main magnetoresistance probe 36 which may be disposed in spaced-apart relationship with respect to the tool bit guide 22, for example, and a magnetoresistance tracking probe 40 which may be provided on the tool bit guide 22, for example. The main magnetoresistance probe 36 is used to determine an estimate of the interface location. The magnetoresistance tracking probe 40 is used to maintain the alignment of the tool bit 30 with respect to the material interface. The main magnetoresistance probe 36 may include an electro magnetic excitation coil, a magnetic flux concentrator and a GMR sensor. The excitation coil may be driven by external circuitry to generate an electromagnetic pulsation having a frequency which is sufficient to permeate the materials which are subject to the chamfering operation. By way of natural physical forces, this electromagnetic pulsation is absorbed and reflected back towards the emitter/sensor arrangement. The variable electromagnetic response and the resultant effect on the GMR material between a solid undisturbed area and an area that contains a material interface, whether that interface is off similar or dissimilar materials, is used to determine the location of the interface. P. Grunberg, "Magnetic Field Sensor With Ferromagnetic Thin Layers Having Magnetically Antiparallel Polarized Components", U.S. Pat. No. 4,949,039.

Figure 8:
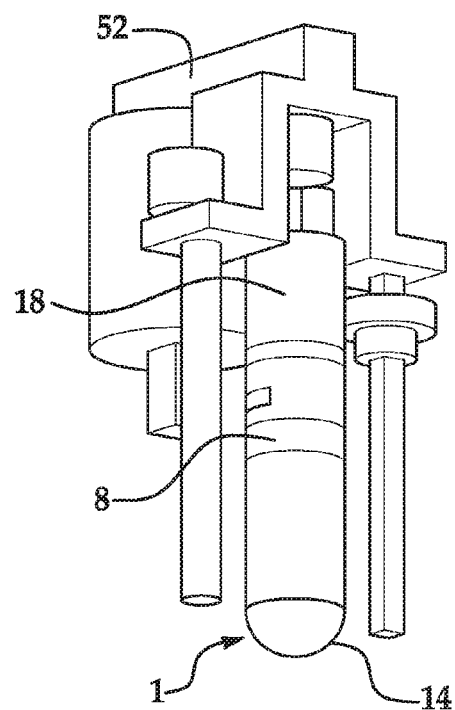
FIG. 8 is a perspective view of an illustrative embodiment of the internal chamfering device mounted on a mount frame.
Figure 9:
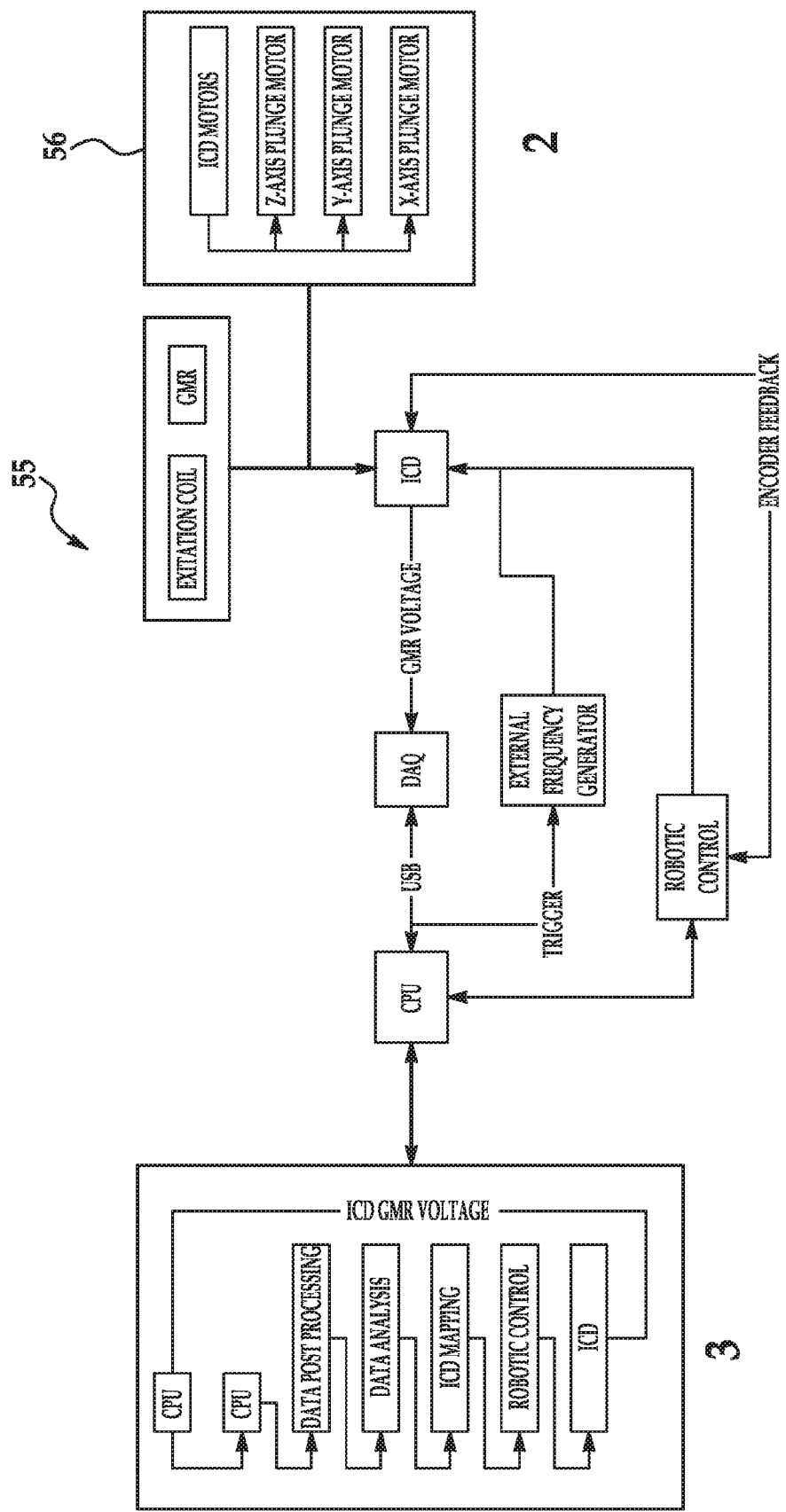
FIG. 9 is a schematic block diagram illustrating a hardware-software interface of an illustrative embodiment of the internal chamfering device.

As shown in FIG. 8, the device 1 may be mounted on a mount frame 52 of selected design. A hardware/software interface 55 which is suitable for implementation of the device 1 is shown in FIG. 9. Various ICD motors 56 may be connected to the device 1 according to the knowledge of those skilled in the art to facilitate various movements of the device 1 with respect to the mount frame 52 (FIG. 8). The ICD motors 56 may include, for example, a z-axis plunge motor 57 which may be adapted to engage the device 1 and move the device 1 along a z-axis; a y-axis rotation motor 58 which may be adapted to engage the device 1 and rotate the device 1 about a y-axis; and an x-axis tool bit motor 59 which may be adapted to drivingly engage the cam bar 2 of the device 1 and move the cam bar 2 in either linear direction in the device housing 7 to extend or retract the tool bit 30 of the device 1 with respect to the tool bit opening 9 in the center sleeve 8 of the device housing 7. The x-axis tool bit motor 59 may engage the bar extension 5 of the cam bar 2, for example.

Figure 7:
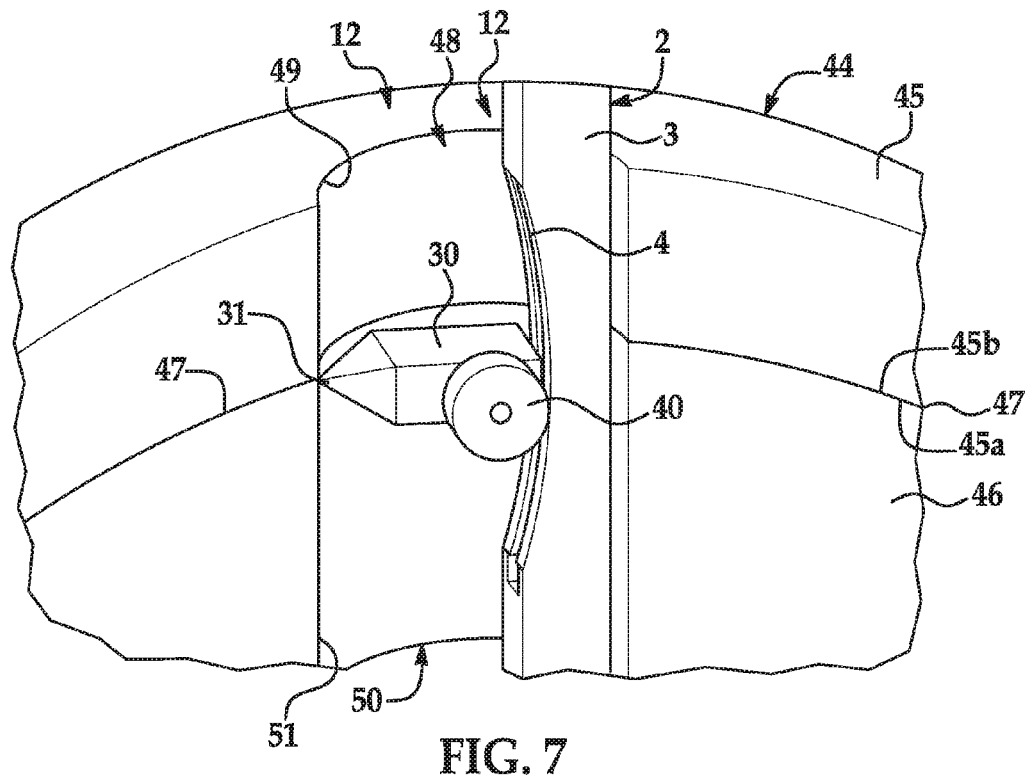
FIG. 7 is a cross sectional view of the cutting assembly of an illustrative embodiment of the internal chamfering device, more particularly illustrating operation of the device in deburring of an opening extending through first and second layers of a layered structure.

Referring next to FIGS. 1 and 7, in typical application the device 1 is used to remove entry and exit burrs (not shown) from and create a material interface chamfer (not shown) in an interior surface 49 (FIG. 7) of a first opening 48 which is drilled in a first layer 45 and in an interior surface 51 (FIG.

7) of a second opening 50 which is drilled in a second layer 46 of a layered structure 44. The purpose of the first opening 48 and the second opening 50 may be to receive a fastener (not shown) which secures the first layer 45 and the second layer 46 to each other. The first layer 45 and the second layer 46 of the layered structure 44 may meet at a layer interface 47. The first layer 45 may have a first fay surface 45*a*. The second layer 46 may have a second fay surface 45*b* which meets the first fay surface 45*a* of the first layer 45 at the layer interface 47. The first opening 48 and the second opening 50 may be drilled into the first layer 45 and the second layer 46, respectively, after the first layer 45 and the second layer 46 are placed together. In some applications the first layer 45 may be a composite material, for example and without limitation, whereas the second layer 46 may be titanium, for example and without limitation. During drilling of the first opening 48 and the second opening 50, entry and exit burrs (not shown) may be left in the first opening 48 and the second opening 50. If left in place, the entry and exit burrs may reduce the fatigue strength of the first layer 45 and/or the second layer 46, particularly if one of the first layer 45 and the second layer 46 is titanium.

The device 1 is inserted into the first opening 48 and the registering second opening 50, as shown in FIG. 1. In FIG. 7, the cutting assembly 12 of the device 1 is shown in the functional chamfering position inside the first opening 48 and the second opening 50. By operation of the z-axis plunge motor 57 (FIG. 9), the device 1 can be moved along the z-axis inside the first opening 48 and the second opening 50. By operation of the y-axis rotation motor 58 (FIG. 9), the device 1 can be rotated about the y-axis inside the first opening 48 and the second opening 50. By operation of the x-axis tool bit motor 59, the cam bar 2 can be moved linearly inside the device housing 7 to selectively extend and retract the tool bit 30 from and into, respectively, the tool bit opening 9 in the center sleeve 8 of the device housing 7. Therefore, by extension of the tool bit 30 from the tool bit opening 9 and against the interior surface 49 of the first opening 48 and the interior surface 51 of the second opening 50, in combination with linear and rotational movement of the device 1 in the first opening 48 and the second opening 50, the tool bit 30 removes entry and exit burrs (not shown) from and creates a material interface chamfer (not shown) in the interior surfaces 49, 51. This may enhance the fatigue strength of the first layer 45 and/or the second layer 46, particularly in applications in which the first layer 45 and/or the second layer 46 is titanium. The deburring and/or chamfering of the first opening 48 and the second opening 50 may be carried out without separating the first layer 45 and the second layer 46.

Referring next to FIG. 10 of the drawings, a flow diagram 1000 which illustrates an example method of forming an opening in a layered structure is shown. In block 1002, a layered structure having first and second layers; a near-zero gap defined at an interface between the first and second layers; and first and second fay surfaces at the interface is provided. In block 1004, an opening is provided through the first layer and the second layer of the layered structure. In block 1006, the opening in the first fay surface of the first layer and the second fay surface of the second layer is worked without separating the first layer and the second layer. Working of the opening in the first fay surface and working of the opening in the second fay surface may include deburring and/or chamfering of the openings.

In some examples, an intermediate layer may be disposed at the interface such that the layered structure is a sandwich-type structure with the first and second layers defining outer layers and the intermediate layer defining an inner structure, such that the fay surfaces of the first and second layers abut the intermediate layer. Providing the openings in the first and second layers may include drilling an opening through the layered structure such that each of the layers has an opening extending therethrough. Working of the openings in the first and second fay surfaces may further include working simultaneously the opening in the fay surface of the first layer, the opening in the fay surface of the second layer and the opening in the intermediate layer without separating the layers.

The first and second layers of the layered structure may include a material selected from a group comprising metals and composites. The intermediate layer may include a material selected from a group comprising composites, adhesives and sealants.

In some applications, the layered structure may be a sandwich-type structure including outer layers of titanium and an intermediate composite layer and a zero-gap interface defined between each of the titanium layers and the composite layer such that each of the layers has a fay surface at an interface. The working step may further include working simultaneously the opening in the fay surface of a first one of the titanium layers and the opening in the corresponding fay surface of the composite layer without separating the layers. In some applications, the method may further include working simultaneously the opening in the fay surface of a second one of the titanium layers and the opening in the corresponding fay surface of the composite layer without separating the layers.

Figure 14:
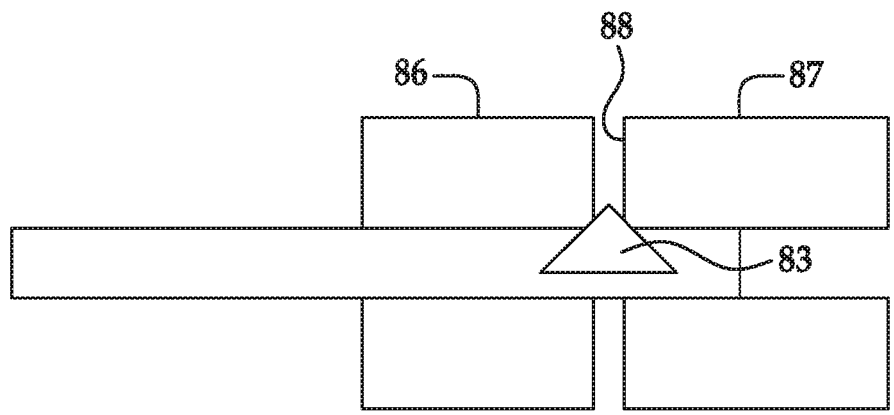
FIG. 14 is a schematic diagram that illustrates deburring of a titanium/titanium stack workpiece.
Figure 15:
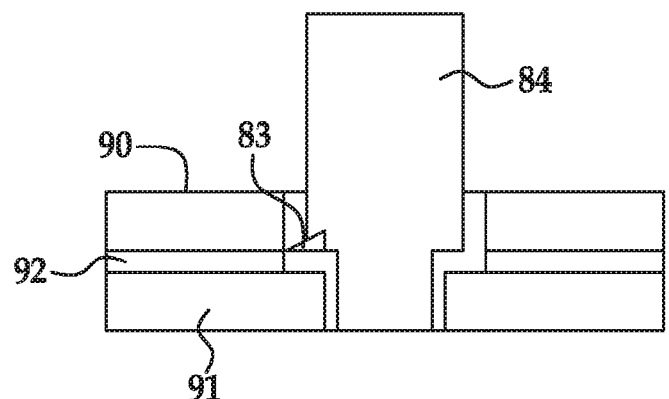
FIG. 15 is a schematic diagram that illustrates modification of a pilot and cutting blade of the deburring tool for deburring of openings with different diameters.
Figure 16:
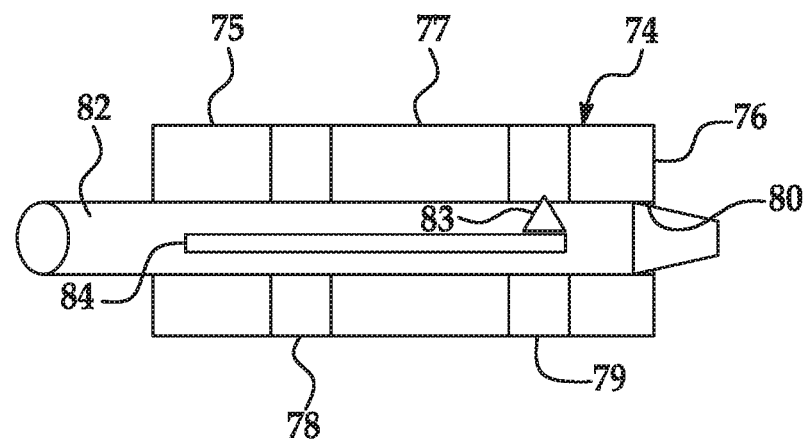
FIG. 16 is a schematic diagram of a titanium/graphite/titanium stack workpiece in implementation of the deburring tool shown in FIGS. 11 and 12.

Referring next to FIGS. 11-16, a deburring tool 64 which is suitable for interface metal deburring of an opening 80 drilled in a workpiece 74 is shown. As shown in FIG. 16, the workpiece 74 may be a titanium/graphite/titanium stack having a first titanium plate 75, a second titanium plate 76 and a graphite plate 77 sandwiched between the first titanium plate 75 and the second titanium plate 76. A first shim 78 may be interposed between the first titanium plate 75 and the graphite plate 77. A second shim 79 may be interposed between the graphite plate 77 and the second titanium plate 76. Each of the first shim 78 and the second shim 79 may be fiberglass, for example. The opening 80 is drilled through the first titanium plate 75, the first shim 78, the graphite plate 77, the second shim 79 and the second titanium plate 76, respectively, of the workpiece 74. After drilling of the opening 80, a metal burr (not shown) may extend from each titanium plate 75, 76 into the opening 80 and may require removal, or deburring, prior to extension of a fastener (not shown) through the opening 80. Accordingly, metal interface deburring of the opening 80 may be carried out using the deburring tool 64 without the requirement of first disassembling the workpiece 74.

As shown in FIGS. 11 and 12, the deburring tool 64 may include a tool housing 65 which may have a generally elongated, cylindrical shape. A nosepiece 66 may be provided on a front end of the tool housing 65. A nose piece stop 67 may be provided on a rear end of the tool housing 65. A chamfer depth control knob 68 may be provided on the nose piece stop 67.

An elongated cutting blade adjustment shaft 82 extends through the tool housing 65, the nosepiece 66, the nosepiece stop 67 and the chamfer depth control knob 68. The nosepiece 66 threadably engages the cutting blade adjustment shaft 82 to facilitate selective extension and retraction of the cutting blade adjustment shaft 82 with respect to the tool housing 65 responsive to rotation of the nosepiece 66. A locking set screw 69 and a locking set screw 70 may be threaded through respective set screw openings (not shown) provided in the tool housing 65 and the chamfer depth control knob 68, respectively, to engage and disengage the cutting blade adjustment shaft 82 responsive to threading and unthreading, respectively, of the locking set screws 69 and 70 in the respective set screw openings.

As shown in FIG. 16, a blade pilot 84 is provided in the cutting blade adjustment shaft 82. A cutting blade 83 is extendable from a blade slot (not shown) provided in the cutting blade adjustment shaft 82. Rotation of the nosepiece 66 facilitates movement of the cutting blade 83 along a longitudinal axis of the cutting blade adjustment shaft 82 as the cutting blade adjustment shaft 82 is extended and retracted with respect to the tool housing 65. The chamfer depth control knob 68 operably engages the cutting blade 83 in such a manner that rotation of the chamfer depth control knob 68 facilitates selective extension and retraction of the cutting blade 83 in the blade slot (not shown) provided in the cutting blade adjustment shaft 82.

In typical application of the deburring tool 64, an aluminum and titanium set-up coupon (not shown) having the same thickness as the workpiece 74 is obtained. Feeler gauges (not shown) can be used to make up the thickness of the set-up coupon. An opening (not shown) having the same size as the opening 80 which is to be drilled in the workpiece 74 is drilled in the set-up coupon. The drilled opening is cleaned and the burr removed from at least one side of the coupon. The nosepiece 66 of the deburring tool 64 is then turned clockwise or counterclockwise until the blade tip of the cutting blade 83 is even with the exit side of the opening.

The blade pilot 84 of the deburring tool 64 is then inserted into the opening drilled in the set-up coupon. The nosepiece 66 is then adjusted until the tip of the cutting blade 83 is about 0.05" away from the edge of the opening, as shown in FIG. 13. As the cutting blade adjustment shaft 82 is pushed in the tool housing 65 (and using a 0.05" shim), the location of the blade tip is checked. The nosepiece 66 may be adjusted as needed to position the tip of the cutting blade 83 to 0.005" away from the coupon. The locking set screw 70 may then be tightened against the cutting blade adjustment shaft 82. Positioning of the tip of the cutting blade 83 about 0.005" away from the periphery of the opening eliminates undercut (groove) in the metal structure and allows thickness variation in up to 0.003".

Adjustment of the chamfer depth control knob 68 may be accomplished by holding the deburring tool 64 with a vise (not shown). The nosepiece 66 is pushed down and protrusion of the cutting blade 83 from the cutting blade adjustment shaft 82 is measured. The chamfer depth control knob 68 is then adjusted until the tip of the cutting blade 83 protrudes 0.005" from the blade pilot 84. The locking set screw 70 is then lightly tightened. An opening in the coupon is deburred. The chamfer is checked and the chamfer depth control knob 68 is adjusted until the desired depth of the chamfer is achieved. A TRULOCK (trademark) chamfer gauge (not shown) may be used to measure the chamfer depth. After the desired chamfer depth is achieved, the locking set screws 69, 70 may be tightened. A titanium plate may be used to check the final chamfer depth and make the necessary adjustments to the cutting blade 83.

For cutting of blade protrusion and location, the steps outlined hereinabove are followed. A set-up coupon, which may be any material but is preferably aluminum and may have the thickness of the first titanium plate 75, the first shim 78, the graphite plate 77 and the second shim 79 of the workpiece 74, minus 0.005", is obtained. An opening having the same size as the opening 80 drilled in the workpiece 74 is drilled in the set-up coupon. The opening is cleaned, after which the blade pilot 84 is inserted in the opening. The nosepiece 66 is adjusted until the blade tip of the cutting blade 83 is flush. A second set-up coupon (not shown) having the same material thickness of the workpiece 74 is obtained, and an opening is drilled in the second set-up coupon. The blade pilot 84 is inserted in the opening while the nosepiece 66 is seated perpendicular and the cutting blade 83 is in the home position. The drill motor of the drill (not shown) is operated slowly. The chamfer is disassembled and checked for undercut into the metal. The chamfer depth control knob 68 is then adjusted until the desired depth is achieved, followed by re-testing. After the desired depth is achieved, the aluminum plate is removed and the titanium plate is replaced in the set-up coupon. An opening is deburred in the set-up coupon and the chamfer depth on the titanium is checked, after which the necessary adjustment is made.

As shown in FIG. 14, in the deburring of a first titanium plate 86 and a second titanium plate 87, a plate gap 88 of a minimum of 0.010" is required between the plates. After insertion of the blade pilot 84 into the drilled opening, the nosepiece 66 is rotated counterclockwise until the cutting blade 83 touches the edge of the opening. The spindle is rotated ⅛ of a turn for a few times. This results in a shiny mark on the edge of the opening and the cutting blade 83. The nosepiece 66 is then rotated until the shiny mark on the cutting blade 83 is about 0.005" away from the tip o the cutting blade 83.

As shown in FIG. 15, in some applications it may be necessary to modify the blade pilot 84 and the cutting blade 83 under circumstances in which there exists limited travel for the blade pilot 84 and when the blade pilot 84 must traverse two different opening sizes. A first opening (not labeled) extends through a titanium plate 90 and a second opening (not labeled) extends through a graphite plate 91. A shim 92 may be interposed between the first titanium plate 90 and the graphite plate 91. For example, under circumstances in which a forcemate bushing must be removed and a freeze plug installed and the titanium structure must be deburred prior to installation of the freeze plug, the blade pilot 84 must be modified. Accordingly, the thickness of the shim 92 must be known since the thickness of the shim 92 determines the travel limit of the blade pilot 84. The blade pilot 84 is pulled out slowly until the tip of the cutting blade 83 is even with the outer diameter of the blade pilot 84. The gap at the faying surface of the blade pilot 84 and the cutting blade adjustment shaft 82 is measured. A spacer/washer is fabricated and placed at the gap, after which the pilot 84 and the cutting blade 83 are assembled. The distance between the end of the blade pilot 84 and the tip of the cutting blade 83 is measured. The end of the blade pilot 84 is grinded to match the smaller of the two openings. The deburring tool 64 is assembled, after which the blade protrusion is adjusted.

Figure 17:
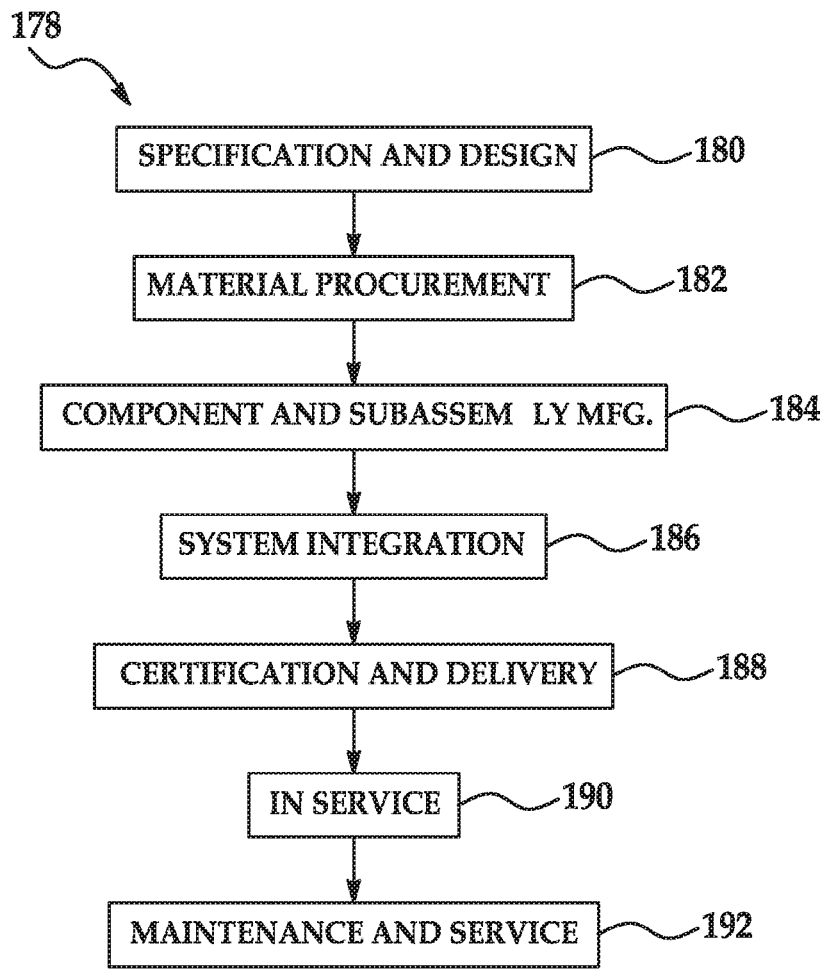
FIG. 17 is a flow diagram of an aircraft production and service methodology.
Figure 18:
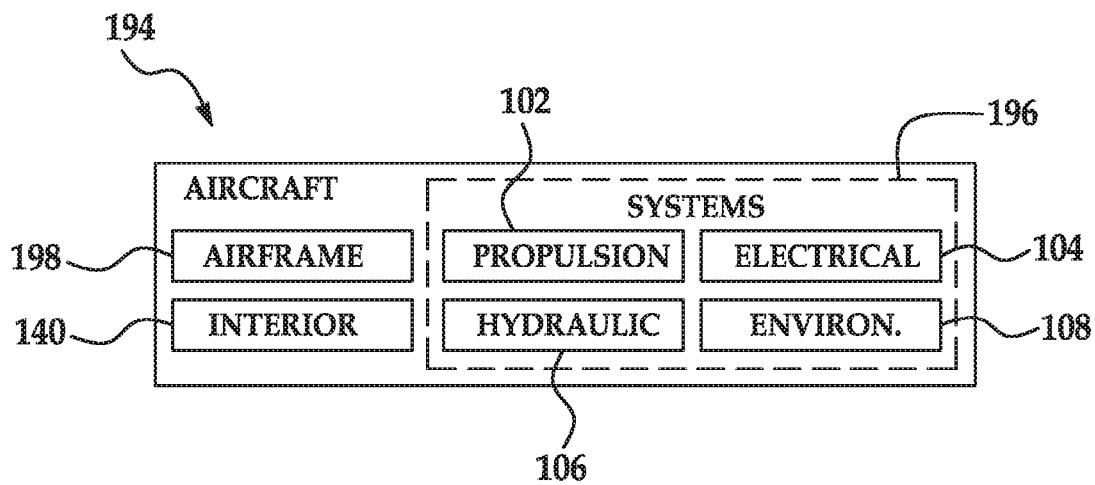
FIG. 18 is a block diagram of an aircraft.

Referring next to FIGS. 17 and 18, examples of the disclosure may be used in the context of an aircraft manufacturing and service method 178 as shown in FIG. 17 and an aircraft 194 as shown in FIG. 18. During pre-production, exemplary method 178 may include specification and design 180 of the aircraft 194 and material procurement 182. During production, component and subassembly manufacturing 184 and system integration 86 of the aircraft 194 takes place. Thereafter, the aircraft 194 may go through certification and delivery 188 in order to be placed in service 190. While in service by a customer, the aircraft 194 may be scheduled for routine maintenance and service 192 (which may also include modification, reconfiguration, refurbishment, and so on).

Each of the processes of method 178 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 194 produced by exemplary method 178 may include an airframe 198 with a plurality of systems 196 and an interior 100. Examples of high-level systems 196 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 178. For example, components or subassemblies corresponding to production process 184 may be fabricated or manufactured in a manner similar to components or subassemblies produced while the aircraft 194 is in service. Also, one or more apparatus embodiments may be utilized during the production stages 184 and 186, for example, by substantially expediting assembly of or reducing the cost of an aircraft 194. Similarly, one or more apparatus embodiments may be utilized while the aircraft 194 is in service, for example and without limitation, to maintenance and service 192.

Figure 19A:
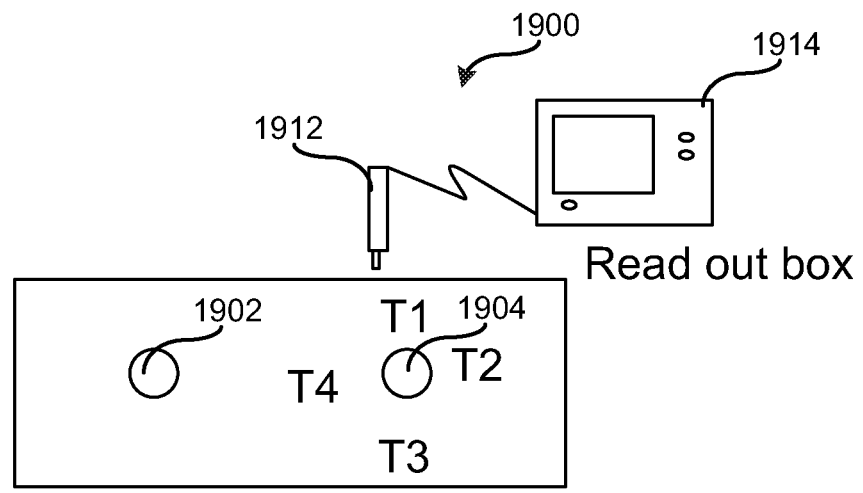
FIGS. 19A and 19B depict a location of an interface between layers being determined in accordance with the examples disclosed herein.
Figure 19B:
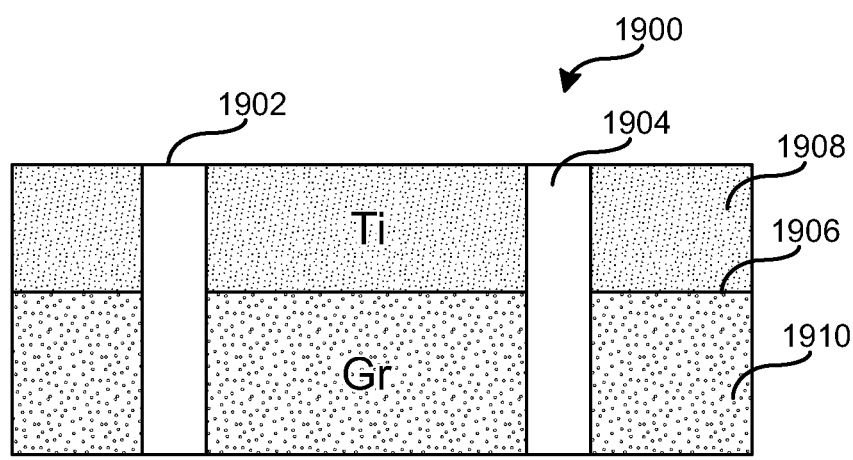

FIG. 19A depicts a top view of a layered structure 1900 through which apertures 1902, 1904 are defined. FIG. 19B depicts a side cross-sectional view of the layered structure 1900 through which the apertures 1902, 1904 are defined. In some examples, to determine a location of an interface 1906 between layers 1908, 1910 of the layered structure 1900, a sensor 1912 may transmit a signal toward and/or into the first layer 1908, which is reflected at the interface 1906 and/or by the second layer 1910 back to the sensor 1912. The sensor 1912 may be an ultrasonic sensor or any other non-destructive instrument. Based on data associated with the received signal, an apparatus and/or processor 1914 determines the location of the interface 1906. In some examples, multiple measurements are taken to determine the location of the interface 1906 as represented by measurement points T1, T2, T3 and/or T4.

Figure 20:
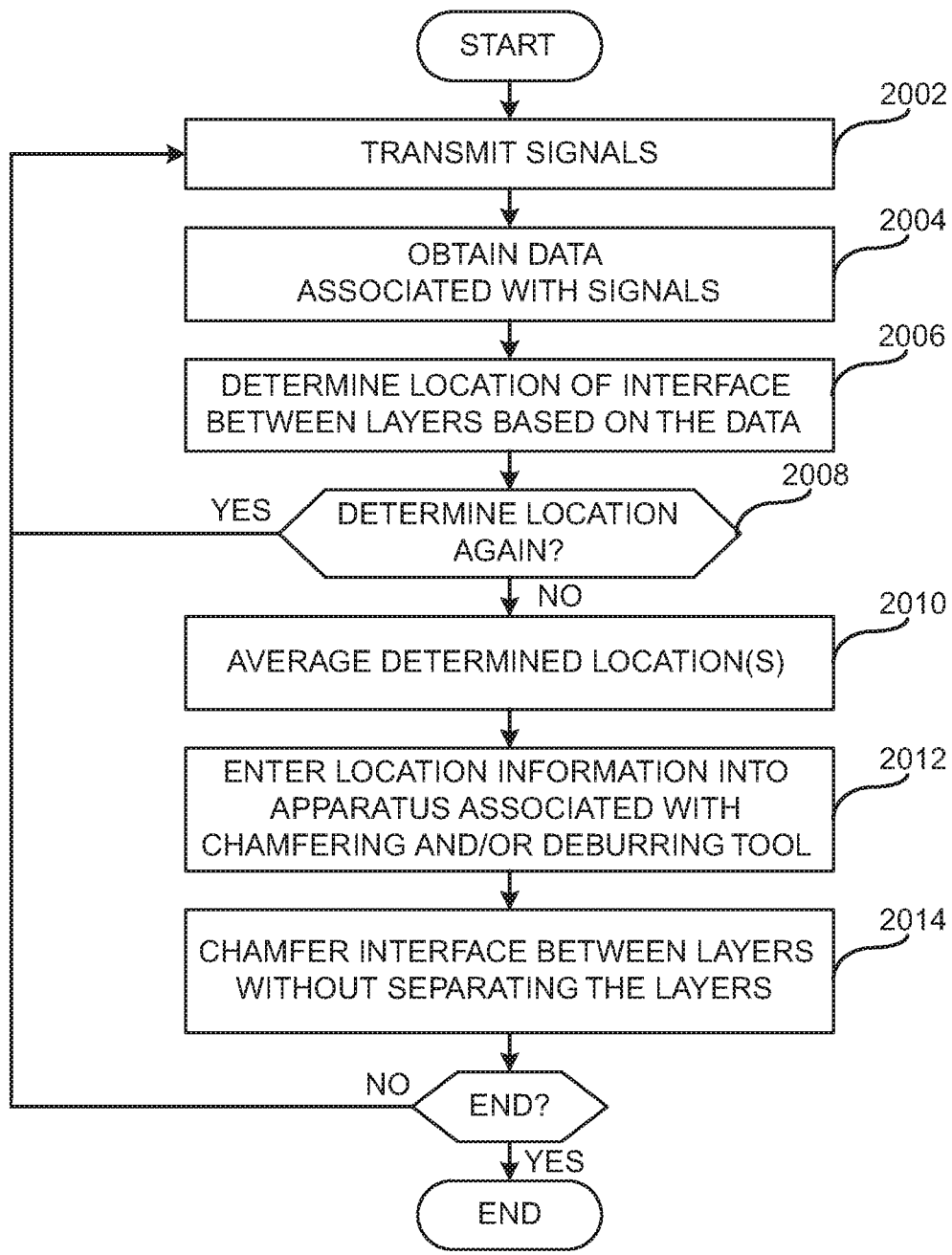
FIG. 20 is an example method of implementing the examples disclosed herein.
Figure 17:
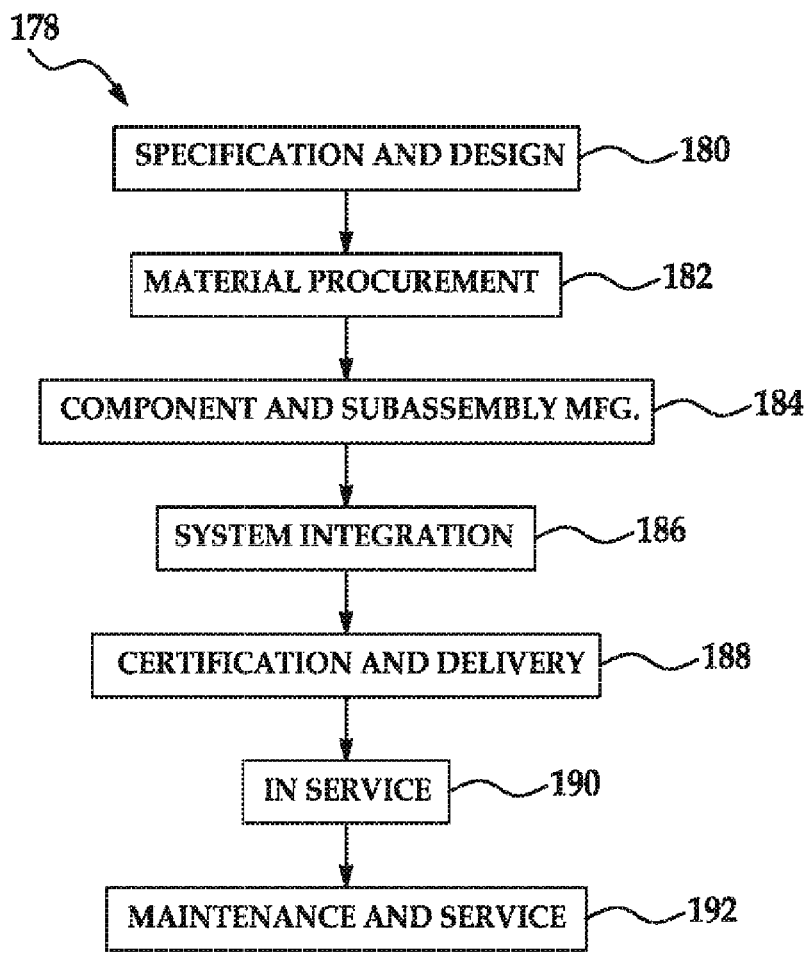
Figure 18:
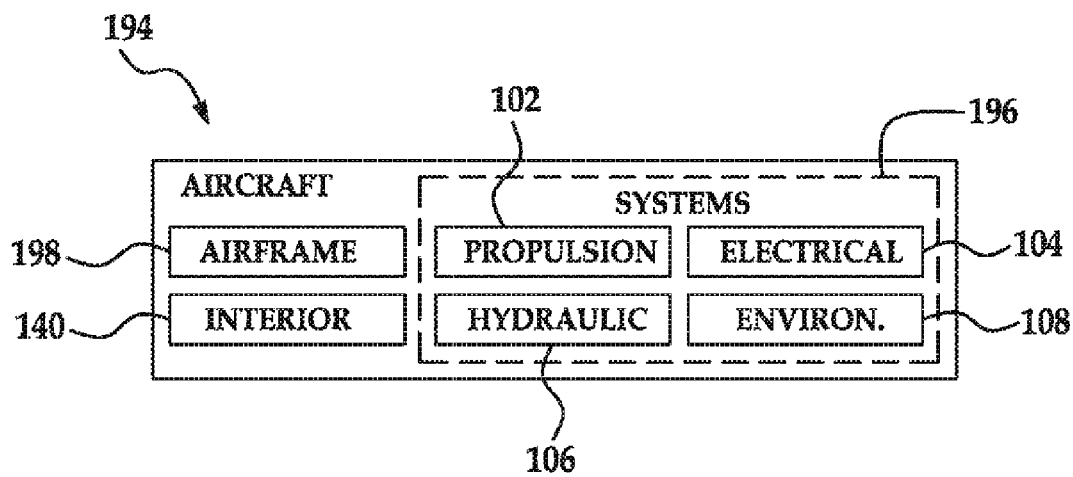

FIG. 20 depicts an example flow diagram representative of processes that may be implemented using, for example, computer readable and executable instructions that may be used to determine a location of an interface between layers and/or chamfer the interface without separating the layers. The example processes of FIG. 20 may be performed using a processor, a controller and/or any other suitable processing device. For example, the example processes of FIG. 20 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 20 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example operations of FIG. 20 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 12 may be implemented manually or as any combination(s) of any of the foregoing techniques, for example, any combination of firmware, software, discrete logic and/or hardware. Further, although the example processes of FIG. 20 are described with reference to the flow diagram of FIG. 20, other methods of implementing the processes of FIG. 20 may be employed. For example, the order of execution of the blocks may be changed, and/or some of the blocks described may be changed, eliminated, sub-divided, or combined. Additionally, any or all of the example processes of FIG. 20 may be performed sequentially and/or in parallel by, for example, separate processing threads, processors, devices, discrete logic, circuits, etc.

The example process 2000 of FIG. 20 may begin by transmitting a signal or signals from one or more transmitters and/or sources 1912 (block 2002) through first and/or second layers 1908, 1910 and receiving the signals at one or more receivers 1912. The received signals may reflect at an interface 1906 between the layers 1908, 1910. In some examples, an aperture 1902, 1904 at least partially extends through the layers 1908, 1910 such that a circumferential interface is defined between the layers 1908, 1910. The transmitters and/or sources may be associated with an ultrasonic transducer and/or sensor 1912. However, any other type of non-destructive instrument may be used.

The received signals may be recorded to generate data associated with the signals (block 2004). One or more processors 1914 may process the data to determine a location of an interface 1906 between the layers (block 2006). In some examples, the location of the interface 1906 may be determined multiple times and the determined locations may be averaged (blocks 2008, 2010). In some examples, measurements may be obtained by positioning the sensor 1912 at different locations about and/or from the aperture (e.g., at different circumferential positions). The location information and/or the averaged location information may be entered into a tool and/or an apparatus associated with a chamfering and/or deburring tool 1, 64 and the interface and/or fay surfaces of the respective first and second layers 1908, 1910 may be chamfered, deburred and/or simultaneously worked by inserting the chamfering tool within the aperture without separating the layers (blocks 2012, 2014). In some examples, prior to chamfering the interface between the layers, a model and/or set-up coupon may be provided that has the same dimensions and/or aperture as the layers. Thus, the chamfering and/or deburring tool can chamfer and/or debur the model prior to chamfering and/or deburring the first and second layers to confirm the accuracy of the location determined.

As set forth herein, an example method includes removing a first fastener from an aperture defined by a layered structure of an aircraft. The layered structure includes a first layer and a second layer. The aperture has a first diameter. The method includes boring the aperture to have a second diameter without separating the layers. The second diameter is greater than the first diameter. The method includes determining a location of an interface between the layers using an ultrasonic sensor and based on the location of the interface, working the interface between the layers to remove a burr created when boring the aperture.

In some examples, the layered structure includes an aircraft wing or a fuselage component. In some examples, the layered structure is coupled by a plurality of fasteners other than the first fastener. In some examples, the method includes inserting a second fastener into the aperture.

An example method of forming an opening in a layered structure includes transmitting and receiving a signal to determine a location of an interface between a first fay surface of a first layer and a second fay surface of a second layer without separating the layers. An aperture extends through at least a portion of the first layer and the second layer. The method includes, based on the location of the interface, working simultaneously the opening in the fay surface of the first layer and the opening in the fay surface of the second layer without separating the first layer and the second layer.

In some examples, transmitting and receiving the signal comprises using a non-destructive instrument to determine the location. In some examples, the non-destructive instrument comprises using an ultrasonic sensor. In some examples, working includes deburring the opening in the first layer and the second layer. In some examples, the first layer comprises metal and the second layer comprises composite. In some examples, transmitting and receiving the signal includes obtaining measurements using an ultrasonic sensor and averaging the measurements to determine the location. In some examples, the measurements are obtained circumferentially around the aperture. In some examples, the first layer or the second layer includes metal, composite, adhesive, or sealant. In some examples, the first layer and the second layer include a layered structure of an aircraft wing or a fuselage component.

An example method includes removing a first fastener from an aperture defined by a layered structure of an aircraft. The layered structure includes a first layer and a second layer. The aperture has a first diameter. The layered structure is coupled by a second fastener. The method includes boring the aperture to have second diameter without separating the layers. The second diameter is greater than the first diameter. The method includes determining a location of an interface between the layers without removing the second fastener and, based on the location of the interface, working the interface between the layers to remove a burr created when boring the aperture. In some examples, the layered structure comprising an aircraft wing or a fuselage component.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of forming an opening in a layered structure, comprising:
   transmitting and receiving a signal to determine a location of an interface between a first fay surface of a first layer and a second fay surface of a second layer without separating the first and second layers, an aperture extending through at least a portion of the first layer and the second layer;
   based on the location of the interface, working simultaneously the opening in the first fay surface of the first layer and the opening in the second fay surface of the second layer without separating the first layer and second layer, wherein prior to the transmitting and the receiving of the signal to determine the location of the interface, further comprising:
   removing a first fastener from the aperture defined by the layered structure, the aperture comprising a first diameter;
   boring the aperture to comprise a second diameter without separating the first and second layers, the second diameter greater than the first diameter;
   the transmitting and the receiving of the signal to determine the location of the interface including determining the location of the interface between the first and second layers using an ultrasonic sensor; and
   the working simultaneously of the opening including working the interface between the first and second layers to remove a burr created when boring the aperture.

2. The method of claim 1, wherein the layered structure comprises an aircraft wing or a fuselage component.

3. The method of claim 1, wherein the layered structure is coupled by a plurality of fasteners other than the first fastener.

4. The method of claim 1, further comprising inserting a second fastener into the aperture.

5. The method of claim 1, wherein the first layer comprises metal and the second layer comprises composite.

6. The method of claim 1, wherein the first layer and the second layer comprise a layered structure of an aircraft wing or a fuselage component.

7. A method of forming an opening in a layered structure, comprising:
   transmitting and receiving a signal to determine a location of an interface between a first fay surface of a first layer and a second fay surface of a second layer without separating the first and second layers, an aperture extending through at least a portion of the first layer and the second layer, transmitting and receiving the signal comprises using a non-destructive instrument to determine the location; and
   based on the location of the interface, working simultaneously the opening in the first fay surface of the first layer and the opening in the second fay surface of the second layer without separating the first layer and second layer, wherein the non-destructive instrument comprises using an ultrasonic sensor.

8. The method of claim 7, wherein working comprises deburring the opening in the first layer and the second layer.

9. The method of claim 7, wherein the first layer or the second layer comprises metal, composite, adhesive, or sealant.

10. The method of claim 7, wherein the first layer comprises metal and the second layer comprises composite.

11. The method of claim 7, wherein the first layer or the second layer comprises metal, composite, adhesive, or sealant.

12. The method of claim 7, wherein the first layer and the second layer comprise a layered structure of an aircraft wing or fuselage component.

13. A method of forming an opening in a layered structure, comprising:

transmitting and receiving a signal to determine a location of an interface between a first fay surface of a first layer and a second fay surface of a second layer without separating the first and second layers, an aperture extending through at least a portion of the first layer and the second layer;

based on the location of the interface, working simultaneously the opening in the first fay surface of the first layer and the opening in the second fay surface of the second layer without separating the first layer and second layer, wherein transmitting and receiving the signal comprises obtaining measurements using an ultrasonic sensor and averaging the measurements to determine the location.

14. The method of claim 13, wherein the measurements are obtained circumferentially around the aperture.

15. The method of claim 13, wherein working comprises deburring the opening in the first layer and the second layer.

16. The method of claim 13, wherein the first layer comprises metal and the second layer comprises composite.

17. The method of claim 13, wherein the first layer or the second layer comprises metal, composite, adhesive, or sealant.

18. A method of forming an opening in a layered structure, comprising:

transmitting and receiving a signal to determine a location of an interface between a first fay surface of a first layer and a second fay surface of a second layer without separating the first and second layers, an aperture extending through at least a portion of the first layer and the second layer; and based on the location of the interface, working simultaneously the opening in the first fay surface of the first layer and the opening in the second fay surface of the second layer without separating the first layer and second layer, wherein prior to the transmitting and the receiving of the signal to determine the location of the interface, further comprising:

removing a first fastener from the aperture defined by the layered structure, the aperture comprising a first diameter, the layered structure being coupled by a second fastener;

boring the aperture to comprise a second diameter without separating the first and second layers, the second diameter greater than the first diameter;

the transmitting and the receiving of the signal to determine the location of the interface including determining a location of the interface between the first and second layers without removing the second fastener; and the working simultaneously of the opening including working the interface between the first and second layers to remove a burr created when boring the aperture.

19. The method of claim 18, wherein transmitting and receiving the signal comprises using a non-destructive instrument to determine the location.

20. The method of claim 18, wherein the layered structure comprises an aircraft wing or a fuselage component.

21. The method of claim 18, wherein transmitting and receiving the signal includes determining the location of the interface between the first and second layers using an ultrasonic sensor.

22. The method of claim 18, wherein the first layer comprises metal and the second layer comprises composite.

* * * * *

UNITED STATES PATENT AND TRADEMARK OFFICE
CERTIFICATE OF CORRECTION

Page 1 of 2

PATENT NO. : 9,517,511 B1
APPLICATION NO. : 13/784442
DATED : December 13, 2016
INVENTOR(S) : Farahnaz Sisco et al.

It is certified that error appears in the above-identified patent and that said Letters Patent is hereby corrected as shown below:

In the Drawings

Figure 17, Block 184: Replace "SUBASSEM LY" with "SUBASSEMBLY"

Signed and Sealed this
Eighteenth Day of April, 2017

Michelle K. Lee
*Director of the United States Patent and Trademark Office*